United States Patent
Colonna et al.

(10) Patent No.: US 12,135,599 B1
(45) Date of Patent: Nov. 5, 2024

(54) DYNAMIC COMPUTING ENVIRONMENT CHANNEL ENABLEMENT

(71) Applicant: INTERNATIONAL BUSINESS MACHINES CORPORATION, Armonk, NY (US)

(72) Inventors: Christopher J Colonna, Ossining, NY (US); Pasquale A. Catalano, Wallkill, NY (US); Michael James Becht, Poughkeepsie, NY (US); Stephen Robert Guendert, Murfreesboro, TN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 51 days.

(21) Appl. No.: 18/326,378

(22) Filed: May 31, 2023

(51) Int. Cl.
*G06F 1/32* (2019.01)
*G06F 1/3206* (2019.01)
*G06F 1/3234* (2019.01)

(52) U.S. Cl.
CPC .......... *G06F 1/3253* (2013.01); *G06F 1/3206* (2013.01)

(58) Field of Classification Search
CPC ............................ G06F 1/3253; G06F 1/3206
See application file for complete search history.

(56) References Cited

U.S. PATENT DOCUMENTS

| | | | |
|---|---|---|---|
| 5,903,746 A | 5/1999 | Swoboda et al. | |
| 7,099,814 B2 | 8/2006 | Hild et al. | |
| 8,001,393 B2 | 8/2011 | Hori et al. | |
| 8,595,364 B2 | 11/2013 | Yahalom et al. | |
| 8,868,797 B1 | 10/2014 | Kirac et al. | |
| 9,513,814 B1 | 12/2016 | Can et al. | |
| 9,553,794 B1 | 1/2017 | Zolla et al. | |
| 10,078,363 B2 | 9/2018 | Kardach et al. | |
| 10,956,088 B2 | 3/2021 | Szczepanik et al. | |
| 2003/0067382 A1* | 4/2003 | Spiess | H04R 3/00 340/572.1 |
| 2008/0209246 A1* | 8/2008 | Marks | H04L 12/12 713/323 |
| 2009/0249102 A1* | 10/2009 | Yong | G06F 1/3275 713/324 |

OTHER PUBLICATIONS

Anonymous, "Method for Providing Power to Fiber Optics Devices," IP.com No. IPCOM000240252D, Jan. 15, 2015, pp. 1-3 (+ cover).

(Continued)

*Primary Examiner* — Stefan Stoynov
(74) *Attorney, Agent, or Firm* — Michael A. Petrocelli, Esq.; Blanche E. Schiller, Esq.; Heslin Rothenberg Farley & Mesiti P.C.

(57) ABSTRACT

A plurality of channels coupling at least one computing device to one or more devices are ranked. The ranking of a channel of the plurality of channels is based on one or more criteria including a size of a path group used to couple the channel to a device of the one or more devices. Based on the ranking, a selected channel of the plurality of channels is selected for which utilization state of the selected channel is to be changed. The utilization state of the selected channel is changed, in runtime, to reduce overall power consumption by the plurality of channels.

20 Claims, 4 Drawing Sheets

(56) References Cited

OTHER PUBLICATIONS

Anonymous, "Ficon Director Logical Aggregation," IP.com No. IPCOM000265309D, Mar. 24, 2021, pp. 1-2 (+ cover).
Vesta Wind Systems A/S, "Power Saving Modes in Modern Distributed Control Systems Utilizing Ethernet Communication Network," IP.com No. IPCOM000220471D, Aug. 1, 2012, pp. 1-22 (+ cover).
Microchip, "Section 10. Power-Saving Modes," DS61130F, 2011 (no further date information available) pp. 10-11 thru 10-14.
IBM, "z/OS Basic Skills Information Center—Networking on z/OS," 2020 (no further date information available), pp. 1-256 (+ cover pages).
IBM, "System z—Fibre Channel Connection (FICON) I/O Interface Physical Layer," SA24-7172-08, 2020 (no further date information available), pp. 1-39 (+ cover pages).

* cited by examiner

DYNAMIC COMPUTING ENVIRONMENT CHANNEL ENABLEMENT

BACKGROUND

One or more aspects relate, in general, to facilitating processing within a computing environment, and in particular, to facilitating communication within the computing environment.

Access to input/output (I/O) devices of a computing environment may be provided via channels, which are part of and/or coupled to one or more computing devices of the computing environment. A channel is used to transfer commands and/or data between the one or more computing devices and one or more devices, such as control units used to access I/O devices and/or one or more I/O devices.

Computing environments that use channels, such as mainframe environments, may demand high availability, including high availability access to the I/O devices. This may result, in times of lower utilization, of unused capacity and high power consumption.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes ranking a plurality of channels coupling at least one computing device to one or more devices. The ranking of a channel of the plurality of channels is based on one or more criteria including a size of a path group used to couple the channel to a device of the one or more devices. Based on the ranking, a selected channel of the plurality of channels is selected for which utilization state of the selected channel is to be changed. The utilization state of the selected channel is changed, in runtime, to reduce overall power consumption by the plurality of channels.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
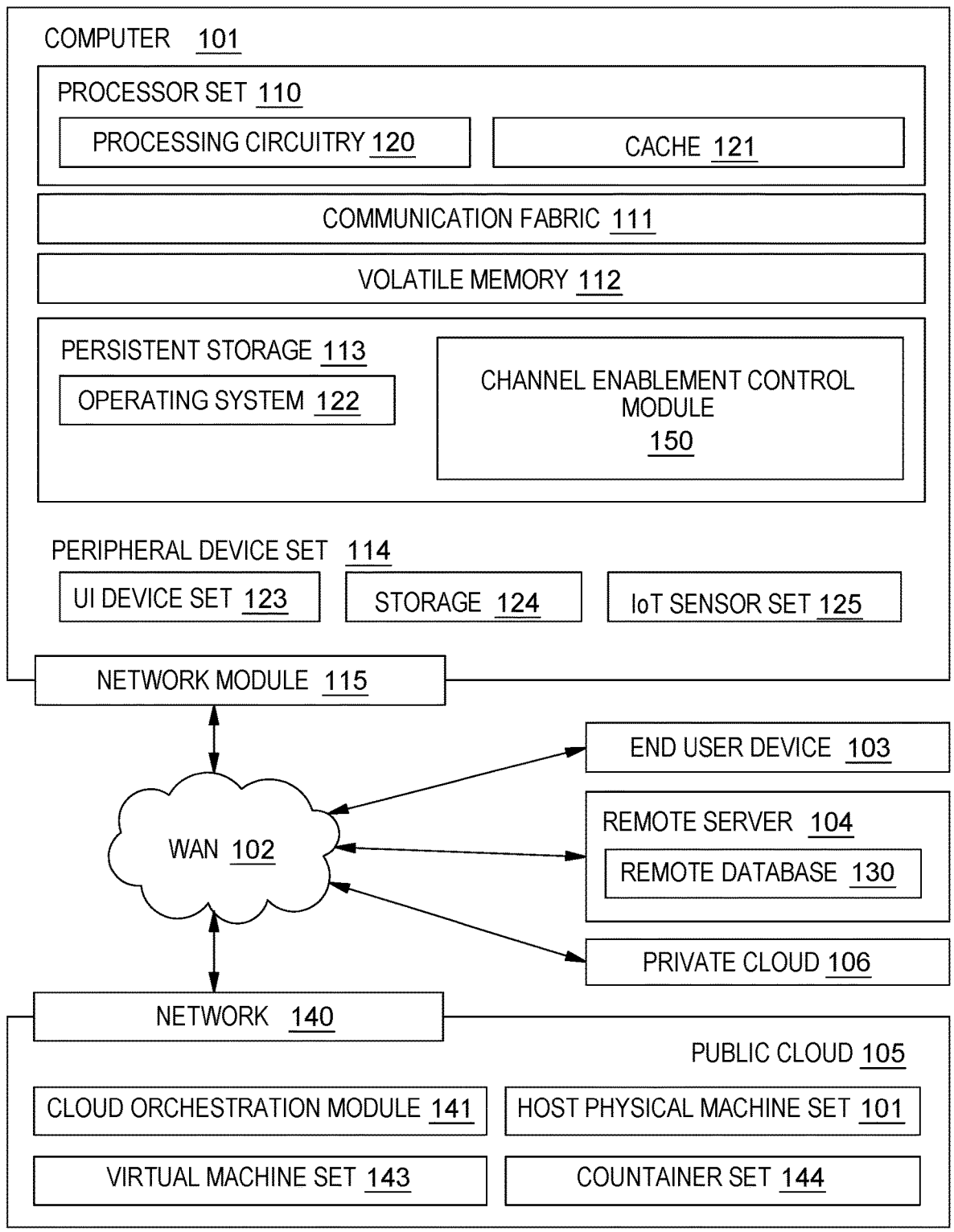
FIG. 1 depicts one example of a computing environment to incorporate, perform and/or use one or more aspects of the present invention.

In accordance with one or more aspects of the present invention, a capability is provided to facilitate processing within a computing environment. In one aspect, the capability includes facilitating communication within the computing environment by dynamically controlling, e.g., in runtime, enablement of channels used to transfer commands and/or data between one or more computing devices and one or more devices, such as control units and/or input/output (I/O) devices. A control unit is used, for instance, to operate and control one or more I/O devices, such as external storage devices (e.g., direct access storage devices and/or other storage devices). A control unit may be physically separate from an I/O device or physically integrated with an I/O device, as examples.

In one example, channels are cycled offline (unenabled)/online (enabled) to remain within a target utilization and to save power. As an example, a ranked list of channels is determined based on their connectivity rates to external ports of devices (e.g., control units and/or I/O devices). One or more of the lowest ranked channels in terms of utilization are powered off to save power consumption. This maintains high availability of the computing environment, including high availability access to, e.g., the I/O devices, while conserving power.

One or more aspects of the present invention are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) that, e.g., controls channel enablement and/or performs one or more other aspects of the present invention. Aspects of the present invention are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present invention is described with reference to FIG. 1. In one example, a computing environment 100 contains an example of an environment for the execution of at least some of the computer code involved in performing the inventive methods, such as channel enablement control code or module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present invention. Other examples are possible. For instance, in one or more embodiments, one or more of the components/modules of FIG. 1 are not included in the computing environment and/or are not used for one or more aspects of the present invention. Further, in one or more embodiments, additional and/or other components/modules may be used. Moreover, in one or more embodiments, one or more of the components/modules may be used to provide functions in addition to and/or different than described above. Other variations are possible.

In accordance with one or more aspects of the present invention, in one or more embodiments, a network module (e.g., network module 115) includes a plurality of channels (e.g., physical channels) used to communicate with a plurality of devices. As examples, one or more of the devices is an end user device (e.g., end user device 103) performing functions as, for instance, a control unit. In other examples, the channels are located elsewhere in a computing device (e.g., computer 101 and/or other computing device) and/or coupled to the computing device. Further, the one or more devices to which the channel communicates may be other than an end user device, including, but not limited to, other control units and/or I/O devices not necessarily depicted in FIG. 1. Many examples are possible.

Figure 2:
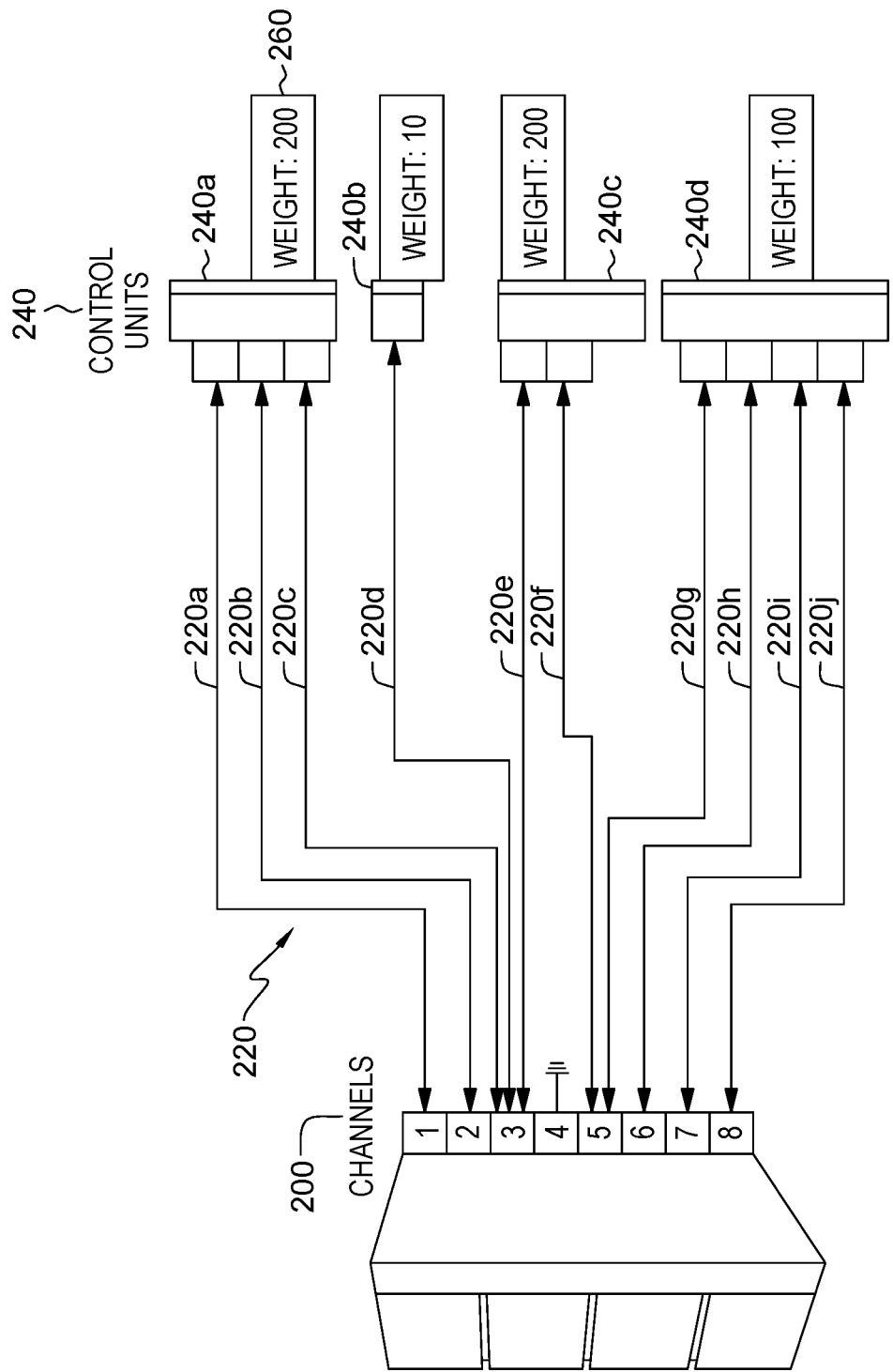
FIG. 2 depicts one example of channels communicatively coupled to devices (e.g., control units), in accordance with one or more aspects of the present invention.

Further details relating to the use of channels and devices (e.g., control units) with respect to one or more aspects of the present invention are described with reference to FIG. 2. In one embodiment, as depicted, a plurality of channels 200 are coupled via one or more paths 220 to one or more devices, such as one or more control units 240. In one example, the channels use the fibre channel protocol, but in other examples, other protocols may be used. The channels send commands and/or data to the devices via paths 220 (also referred to as channel paths), and the devices send, e.g., data back to the channels based, e.g., on the commands, via paths 220. As examples, channels 1, 2 and 3 are coupled via paths 220a, 220b, 220c, respectively, to a control unit 240a; channel 3 is coupled via a path 220d to a control unit 240b and via a path 220e to a control unit 240c; channel 4 is not coupled to any control unit; channel 5 is coupled via a path 220f to control unit 240c and via a path 220g to a control unit 240d; and channels 6-8 are coupled via paths 220h, 220i and 220j, respectively, to control unit 240d. Other variations are possible. For instance, additional, fewer and/or other channels and/or control units may be used. Further, in other examples, one or more of the channels may be coupled to an I/O device directly, rather than through a control unit. Moreover, additional, fewer and/or other channel paths may be used to couple channels 200 and devices, such control units 240 and/or I/O devices; and/or additional, fewer and/or other channels/devices may be used. Many variations are possible.

In one example, paths to/from a particular control unit is referred to herein as a path group. For instance, paths 220a, 220b and 220c are one path group; path 220d is another path group; paths 220e and 220f are another path group; and paths 220g, 220h, 220i and 220j are yet another path group. The path groups shown are just example path groups. Additional, fewer and/or other path groups may be established.

In one example, a control unit (and/or an I/O device) has an optional weight 260 associated therewith. For instance, control unit 240a has a weight of 200 assigned thereto; control unit 240b has a weight of 10; control unit 240c has a weight of 200; and control unit 240d has a weight of 100. The particular weights mentioned herein are just examples. A device may have another weight or even no weight associated therewith. There may also be more than one weight assigned, such as a weight per channel or for select channels. Many examples are possible. The weights are provided by, e.g., one or more users, and used, for instance, to determine rankings for one or more of the channels, as described herein.

In one or more aspects, to determine rankings and channel enablement, a channel enablement control module, such as a channel enablement control module 150, may be used. Further details relating to channel enablement control module 150 are described with reference to FIG. 3. In one example, channel enablement control module 150 includes code or instructions used to control channel enablement (e.g., dynamically—e.g., in runtime), in accordance with one or more aspects of the present invention.

Figure 3:
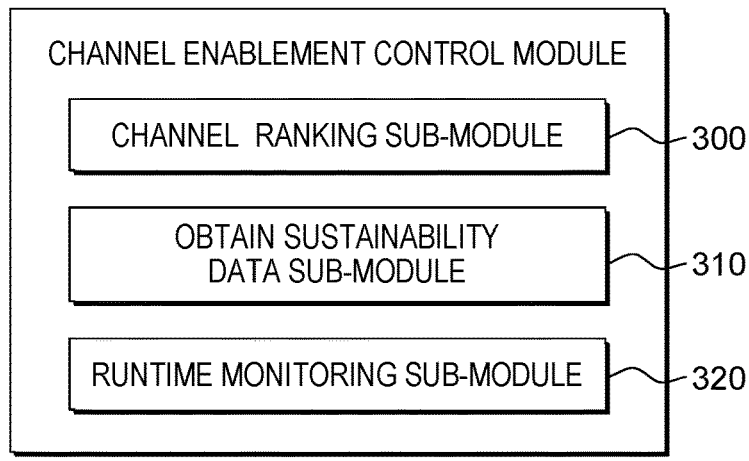
FIG. 3 depicts one example of sub-modules of a channel enablement control module of FIG. 1, in accordance with one or more aspects of the present invention.

In one or more aspects, referring to FIG. 3, a channel enablement control module (e.g., channel enablement control module 150) includes, in one example, various sub-modules to be used to control channel enablement and/or to perform tasks relating thereto. The sub-modules are, e.g., computer readable program code (e.g., instructions) in computer readable media, e.g., storage (persistent storage 113, cache 121, storage 124, other storage, as examples). Although, as an example, channel enablement control module 150 is depicted in FIG. 1 in persistent storage 113, one or more sub-modules may be in other storage, etc. Many variations are possible.

The computer readable media may be part of one or more computer program products and the computer readable program code may be executed by and/or using one or more computing devices (e.g., one or more computers, such as computer(s) 101; one or more servers, such as remote server(s) 104; one or more processors or nodes, such as processor(s) or node(s) of processor set 110; processing circuitry, such as processing circuitry 120 of processor set 110) and/or other computing devices, etc.) and/or one or more devices, such as end user device(s) 103, one or more other control units, one or more I/O devices, etc. Additional and/or other computers, servers, processors, nodes, processing circuitry, computing devices and/or devices may be used to execute one or more of the sub-modules and/or portions thereof. Many examples are possible.

Example sub-modules of channel enablement control module 150 include, for instance, a channel ranking sub-module 300 to rank channels based on connectivity; an obtain sustainability data sub-module 310 to optionally obtain sustainability data relating to various channels; and/or a runtime monitoring sub-module 320 to monitor channel utilization during runtime. Additional, fewer and/or other sub-modules may be used to implement the channel enablement control processing. Other variations are possible. Although various sub-modules are described, a channel enablement control module, such as channel enablement control module 150, may include additional, fewer and/or different sub-modules. A particular sub-module may include additional code, including code of other sub-modules, less code, and/or different code. Further, additional and/or other modules may be used to control channel enablement and/or perform related tasks. Many variations are possible.

One or more of the sub-modules are used, in accordance with one or more aspects of the present invention, to perform channel ranking and/or perform other tasks related thereto, as further described with reference to FIG. 4. In one example, a channel ranking process (e.g., a channel ranking process 400) is implemented using one or more of the sub-modules (e.g., sub-module 300) and is executed by a computing device (e.g., computer (e.g., computer 101, other computer, etc.), a server (e.g., server 104, other server, etc.), a processor, node and/or processing circuitry, etc. (e.g., of processor set 110 or other processor sets), and/or one or more other computing devices, etc.). Although example computers, servers, processors, nodes, processing circuitry and/or computing devices are provided, additional, fewer and/or other computers, servers, processors, nodes, processing circuitry, computing devices and/or other devices may be used for the channel ranking process and/or other processing. Various options are possible.

Figure 4:
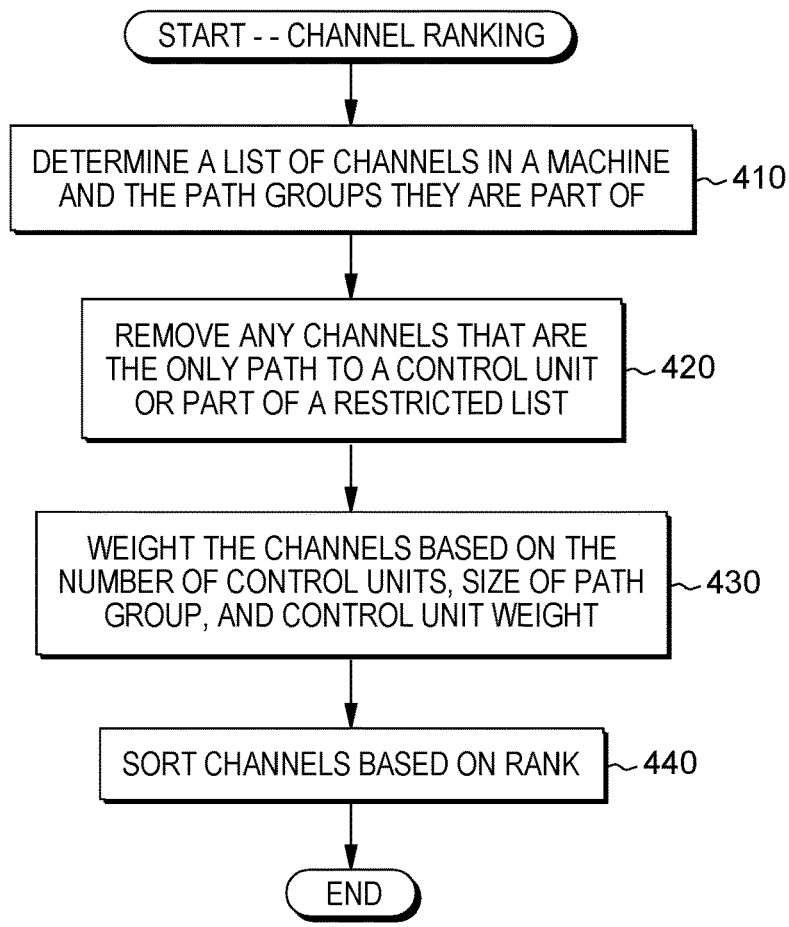
FIG. 4 depicts one example of a channel ranking process, in accordance with one or more aspects of the present invention.

In one example, referring to FIG. 4, channel ranking process 400 (also referred to herein as process 400) performs channel ranking based on connectivity (e.g., rather than utilization). In one example, process 400 determines 410 a list of channels (e.g., physical channels) in a machine (e.g., a mainframe, a computer (e.g., computer 101), other computers, or computing devices, etc.) and one or more path groups to which they belong. In one example, this is determined by obtaining configuration information for the machine via, e.g., a command, instruction, etc. As one example, in a mainframe environment, this configuration is determined by, e.g., a configuration file, such as an Input/Output Configuration Data Set, which details which channels are connected to which devices (e.g., control units, I/O devices) and how they are connected. This determines the path groups. In other examples, regardless of the type of environment, the configuration information is obtained by examining the physical connectivity between the channels and devices (e.g., control units, I/O devices) and determining if a path exists that would allow for a connection. Further, in one or more examples, test messages or packets may be sent to verify connections. Other examples are also possible.

Process 400 removes 420 any channel from the list of channels that is, for instance, the only path to a particular device (e.g., control unit and/or I/O device) or is on a restricted list, assuming there is such a restricted list. For instance, referring to FIG. 2, channel 3 is removed from the list of channels (or simply ignored) since it is the only channel to control unit 240b. That is, the path group from channel 3 to control unit 240b only includes one path, e.g., path 220d, and therefore, it is not to be unenabled for power savings, in accordance with one or more aspects of the present invention.

Returning to FIG. 4, process 400 weights 430 each remaining channel in the list of channels based on one or more factors, including, but not limited to, a number of control units coupled to a channel, size of a path group for the control unit coupled to the channel and/or control unit weights assigned to the one or more control units coupled to the channel. For example, referring to FIG. 2, the weight for channel 1 is equal to 67 (e.g., 200/3=weight of control unit 240a/number of paths in the path group for control unit 240a); the weight for channel 2 is equal to 67 (e.g., 200/3=weight of control unit 240a/number of paths in the path group for control unit 240a); the weight for channel 3 is not computed in this example, since channel 3 is not considered for unenabling in this processing due to the size of the path group to control unit 240b being 1; the weight for channel 4 is also not computed, in this example, since channel 4 is not coupled to any control unit; the weight for channel 5 is equal to 125 (e.g., 100/4+200/2=weight of control unit 240d/number of paths in path group for control unit 240d+ weight of control unit 240c/number of paths in path group for control unit 240c); the weight for channel 6 is equal to 25 (e.g., 100/4=weight of control unit 240d/number of paths in the path group for control unit 240d); the weight for channel 7 is equal to 25 (e.g., 100/4=weight of control unit 240d/number of paths in the path group for control unit 240d); and the weight for channel 8 is equal to 25 (e.g., 100/4=weight of control unit 240d/number of paths in the path group for control unit 240d). Other examples are possible.

In one example, the determined channel weights indicate the rankings. For instance, the channels with the highest weights relative to the determined weights have a higher availability or connectivity ranking than those channels with lower weights. Other examples are possible.

Returning to FIG. 4, subsequent to determining the rankings, process 400 sorts 440 the channels based on the rankings. In one example, the channels are ranked from the highest weight to the lowest weight. For instance, the sorted ranked list for the channels of FIG. 2 includes from highest to lowest ranked: channel 5, channels 1-2, and channels 6-8. Other example sorts are possible. The channels with the lowest ranking will be considered for unenablement prior to those with a higher ranking, in one example. For instance, channels 6-8 with a ranking of 25 are considered for unenabling or switching offline prior to channels 1-2 with a ranking of 67 and channel 5 with a ranking of 125. In this example, channel 5 is the last channel to be considered for unenablement/switching offline.

In one or more examples, all determined channels are ranked and sorted. In other examples, selected channels are ranked and sorted. Other variations are possible.

In one or more aspects, one or more of the sub-modules are used to perform runtime monitoring and/or perform other tasks related thereto, as further described with reference to FIG. 5. In one example, a runtime monitoring process (e.g., a runtime monitoring process 500) is implemented using one or more of the sub-modules (e.g., one or more of sub-modules 310, 320) and is executed by a computing device (e.g., computer (e.g., computer 101, other computer, etc.), a server (e.g., server 104, other server, etc.), a processor, node and/or processing circuitry, etc. (e.g., of processor set 110 or other processor sets), and/or one or more other computing devices, etc.). Although example computers, servers, processors, nodes, processing circuitry and/or computing devices are provided, additional, fewer and/or other computers, servers, processors, nodes, processing circuitry, computing devices and/or other devices may be used for the runtime monitoring process and/or other processing. Various options are possible.

Figure 5:
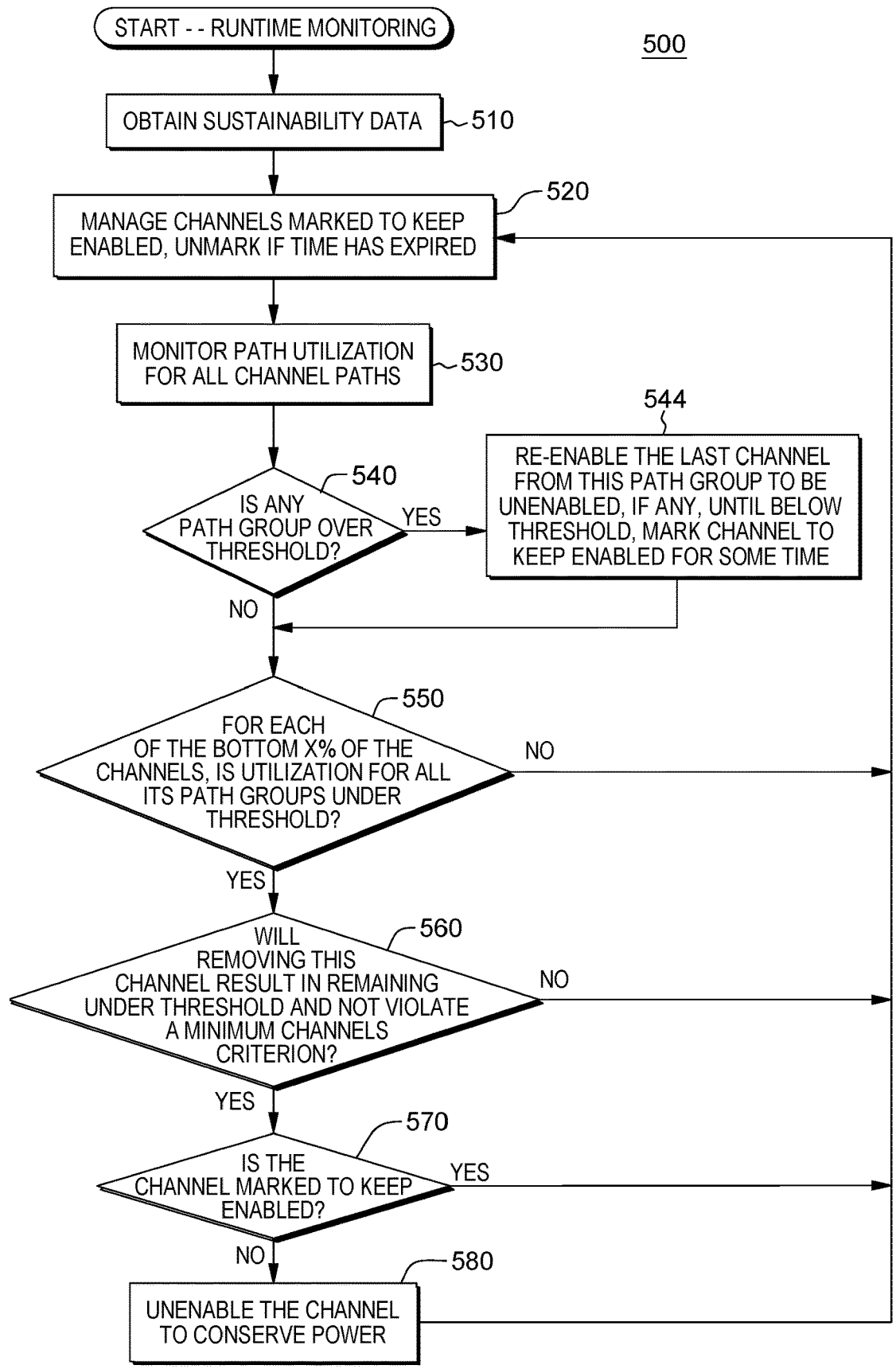
FIG. 5 depicts one example of a runtime monitoring process, in accordance with one or more aspects of the present invention.

In one example, referring to FIG. 5, runtime monitoring process 500 (also referred to as process 500) optionally obtains 510 sustainability data, such as sustainability data of a customer/user including, for instance, one or more of the following criteria: target channel utilization, minimum number of channels per path group for availability, weights for the control units, and/or a list of channels not to be modified (e.g., restricted list). Additional, fewer and/or other criteria may be considered and obtained from, e.g., a customer/user. In one example, runtime monitoring process 500 obtains the sustainability data by reading it from storage and/or from input to an application programming interface. Other examples are possible.

Process 500 manages 520 selected channels, such as those marked as keep enabled and/or those to be unmarked if the time for keeping them enabled has expired. For instance, in one example, if a channel has recently been enabled or re-enabled, then it is not to be unenabled for a programmable predefined time period (e.g., n minutes, where n is 5-10 minutes; other defined time period; etc.). As another example, if a channel has been repeatedly unenabled/enabled within a programmable defined time (e.g., last n minutes (e.g., 5 minutes; other defined time; etc.); x times within n minutes (e.g., greater than 5 times in 5 minutes, etc.); other defined times, etc.), then it is enabled for a programmable amount of time (e.g., 10 minutes; another defined time, etc.). Other examples also exist.

Process 500 monitors 530 path utilization for the channel paths being monitored. As examples, process 500 uses commands and/or instructions to monitor and/or obtain path utilization data. For example, each channel maintains performance metrics describing, e.g., how busy it is on, for instance, a percentage scale. The busy percentage of the channels of a path group may be averaged together to determine the path group utilization. Other monitoring techniques may be used.

Process 500 determines 540 whether a path group has a predetermined relationship with a threshold (e.g., utilization is greater than the threshold). Should the path group have the predetermined relationship with the threshold (e.g., greater than 50% utilization or another defined relationship/threshold), then process 500 re-enables 544 one or more selected channels of the path group (e.g., the last channel(s) of the path group to be unenabled, if any) until another predetermined relationship with the threshold (e.g., below the threshold) is reached. The one or more channels re-enabled are marked to keep enabled for a programmable amount of time (e.g., 5 minutes; another defined time; etc.).

Thereafter, or if there are no path groups having a predetermined relationship with the threshold, process 500 determines 550 for each of the bottom X % (e.g., 10% or other selected percentage) of the channels in the sorted rank list if the utilization for its path groups (e.g., all its path groups) has a predefined relationship with the threshold (e.g., less than 25% utilization or another predefined relationship/threshold). If the path groups for a channel at the bottom meets this criterion, then process 500 determines 560 whether removing the channel results in the path groups that include that channel remaining under the threshold or whether removal will violate a criterion of a minimum number of channels (e.g., at least one channel) in the path group. If utilization of the path group remains under the utilization threshold and the minimum channels criterion is not violated, then process 500 further checks 570 whether the channel is marked to keep enabled. If the channel is not marked to keep enabled, then process 500 unenables (e.g., powers off, offline) 580 the channel to conserve power, and processing continues to manage the channels 520.

However, in one example, if the channel is marked to keep enabled (inquiry 570), the utilization of the path group does not remain under the threshold (inquiry 560), the minimum channels criterion is violated (inquiry 560) or if utilization of the path groups having this channel is not under the threshold (inquiry 550), processing continues to manage the channels 520.

In one example, operations 550-580 are performed for each channel ranked in the bottom X % (e.g., 10% or other selected percentage).

As described herein, a capability is provided to dynamically control, in runtime, utilization of channels in order to provide high availability but conserve power. In one or more aspects, channels are configured offline/online to remain within a target utilization in order to save power, understanding that a single channel may be part of multiple path groups. In one or more aspects, the configuring offline/online (i.e., the changing utilization state) is performed automatically in that, at the very least, a computing device or other device initiates the change in utilization state by, e.g., indicating the change, initiating the enabling/unenabling and/or performing the enabling/unenabling. Other variations are possible.

In one or more aspects, a channel by channel ranking is performed of what each channel contributes to the overall configuration, adjusted for weighting. In one or more aspects, a channel that is, e.g., 1 of 4 paths to a control unit ranks higher than a channel that is, e.g., 1 of 8; a channel that is a member of, e.g., 2 equal sized path groups ranks higher than a channel that is a member of, e.g., 1; channels that are the only path to a control unit are eliminated from the list; channel weight=(CU1 weight/#channels in path group)+ (CU2 weight/#channels in path group)+ . . . , where CU is control unit; after a configuration change (dynamic I/O, configure offline/online, link down/up, etc.), recalculation of, e.g., channel ranking may be performed.

In one or more aspects, input from the customer/user is solicited for sustainability data. This could include target channel utilization, minimum number of channels per path group for availability, a weight for control units, and a list of channels not to modify, as examples. Additional, fewer and/or other inputs may be obtained.

In one or more aspects, continuous monitoring of channel path utilization is performed. As examples, when removal of the lowest ranking channel in the path would not violate a minimum path number or a maximum path utilization (based on re-projecting the current usage over 1 fewer path), the path is removed; and when utilization goes above a threshold, the last channel that was removed, if any, is restored until the reprojected utilization is within range (or there are no more channels to add).

In one or more aspects, channels are brought online rapidly to restore capacity, and brought offline slowly in order to prevent flapping links.

In one or more aspects, for a system with a plurality of paths to reach a plurality of external ports, a sustainability target and availability threshold are provided from a user, and a ranking of the available paths is determined. Paths are cycled off and on to achieve optimal power savings while remaining within the target thresholds. A high-availability set of paths is made less available within defined limits to save power.

In one or more aspects, a capability is provided to enhance power savings for at least one computing device having fiber connections to external ports. The capability includes detecting and determining channels from the at least one computing device and corresponding paths in path groups for the channels from the at least one computing device using fiber connection to the plurality of external ports; weighting the channels based, e.g., on a number of control units (or other devices), size of path groups and control unit weight; sorting the channels based on the weights on the channels; and cycling one or more of the channels between an on state and an off state based on the sorting to sustain channel utilization parameters and remain with target thresholds for the paths.

In one embodiment, a channel that was taken offline is tracked. If channels of equal weight value are selected to be varied off, the channel with the least number of offline counts is selected, to increase lifespan of the optics (e.g., step 544 of FIG. 5).

If there is additional data available on link reliability (such as reliable data protocol data, bit error rate, optical power consumption), then that may be used in the weighting to determine if a path should be brought online/offline, if the optic/link is marginal. Additional, fewer and/or other criteria/factors may be considered.

One or more aspects may be used with various protocol types and server types. In one or more aspects, if distinctive paths from a target to a device are identified, and the redundancy is obvious, or can be determined, or is defined by a user, then one or more aspects may be applied to those link types. Other variations are also possible.

In one embodiment, a history of link transitions my be used to help make a better determination as to when/if a link should be brought online/offline, which could be used to exclude the link from future actions. Other considerations are possible.

In one or more aspects, artificial intelligence may be used to continuously learn about the configuration and when it is desired to unenable one or more channels to conserve power and/or to re-enable one or more channels. An artificial intelligence process may run on a computing device and provide input to one or more of the processes herein. It may provide training (e.g., a training model) to the processes/computing devices and that training may be iteratively performed to provide enhanced data, knowledge, etc. of when to unenable/re-enable a channel. Many possibilities exist.

One or more aspects of the present invention are tied to computer technology and facilitate processing within a computer, improving performance thereof. For instance, communication within a computing environment is improved by providing a capability to control channel enablement. A capability is provided to control, at runtime, which channels are to be enabled/unenabled in order to conserve power. Processing within a processor, computer system and/or computing environment is improved.

Other aspects, variations and/or embodiments are possible.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

Yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, different types of channels may be used. Further, different thresholds and/or techniques to determine connectivity and/or utilization may be used. Many variations are possible.

Various aspects and embodiments are described herein. Further, many variations are possible without departing from a spirit of aspects of the present invention. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
 one or more computer readable storage media and program instructions collectively stored on the one or more computer readable storage media to perform a method comprising:
 ranking a plurality of channels coupling at least one computing device to one or more devices, the ranking of a channel of the plurality of channels being based on one or more criteria including a size of a path group used to couple the channel to a device of the one or more devices;

selecting, based on the ranking, a selected channel of the plurality of channels for which utilization state of the selected channel is to be changed; and changing, in runtime, the utilization state of the selected channel to reduce overall power consumption by the plurality of channels.

2. The computer program product of claim 1, wherein the changing, in runtime, the utilization state of the selected channel includes unenabling the selected channel.

3. The computer program product of claim 1, wherein the method further comprises monitoring, in runtime, utilization of the plurality of channels, and wherein the selecting is further based on the monitoring, in runtime, the utilization.

4. The computer program product of claim 3, wherein the method further comprises determining, based on the monitoring, in runtime, the utilization, whether a path group that includes the selected channel has a predefined relationship with a threshold, and wherein the selecting the selected channel is based on the selected channel having the predefined relationship with the threshold.

5. The computer program product of claim 3, wherein the method further comprises:

selecting, based on the monitoring, in runtime, utilization of the plurality of channels, another channel for which the utilization state is to be changed; and changing the utilization state of the another channel.

6. The computer program product of claim 5, wherein the changing the utilization state of the another channel includes enabling the another channel.

7. The computer program product of claim 1, wherein the selecting, based on the ranking, the selected channel is further based on a tracking of offline counts for one or more channels of the plurality of channels.

8. The computer program product of claim 1, wherein the ranking includes:

using at least a portion of the one or more criteria to determine a plurality of weights for the plurality of channels; and ranking the plurality of channels based on the plurality of weights.

9. The computer program product of claim 1, wherein the method further includes:

selecting the plurality of channels to be ranked, the selecting the plurality of channels to be ranked including:

determining a list of channels;

determining a plurality of path groups for the list of channels;

determining whether one or more channels of the list of channels are to be removed from the list of channels, the determining being based on one or more factors including one or more sizes of the plurality of path groups; and removing at least one channel of the one or more channels from the list of channels, based on determining that the at least one channel is to be removed, providing the plurality of channels to be ranked.

10. The computer program product of claim 9, wherein the determining whether the one or more channels of the list of channels are to be removed includes:

determining whether a given channel of the one or more channels is part of a single path to a given device of the one or more devices; and removing the given channel from the list of channels based on the given channel being part of the single path to the given device.

11. A computer system for facilitating processing within a computing environment, the computer system comprising:

a memory; and one or more processors in communication with the memory, wherein the computer system is configured to perform a method, said method comprising:

ranking a plurality of channels coupling at least one computing device to one or more devices, the ranking of a channel of the plurality of channels being based on one or more criteria including a size of a path group used to couple the channel to a device of the one or more devices;

selecting, based on the ranking, a selected channel of the plurality of channels for which utilization state of the selected channel is to be changed; and changing, in runtime, the utilization state of the selected channel to reduce overall power consumption by the plurality of channels.

12. The computer system of claim 11, wherein the method further comprises monitoring, in runtime, utilization of the plurality of channels, and wherein the selecting is further based on the monitoring, in runtime, the utilization.

13. The computer system of claim 12, wherein the method further comprises determining, based on the monitoring, in runtime, the utilization, whether a path group that includes the selected channel has a predefined relationship with a threshold, and wherein the selecting the selected channel is based on the selected channel having the predefined relationship with the threshold.

14. The computer system of claim 11, wherein the ranking includes:

using at least a portion of the one or more criteria to determine a plurality of weights for the plurality of channels; and ranking the plurality of channels based on the plurality of weights.

15. The computer system of claim 11, wherein the method further includes:

selecting the plurality of channels to be ranked, the selecting the plurality of channels to be ranked including:

determining a list of channels;

determining a plurality of path groups for the list of channels;

determining whether one or more channels of the list of channels are to be removed from the list of channels, the determining being based on one or more factors including one or more sizes of the plurality of path groups; and removing at least one channel of the one or more channels from the list of channels, based on determining that the at least one channel is to be removed, providing the plurality of channels to be ranked.

16. A computer-implemented method of facilitating processing within a computing environment, the computer-implemented method comprising:

ranking a plurality of channels coupling at least one computing device to one or more devices, the ranking of a channel of the plurality of channels being based on one or more criteria including a size of a path group used to couple the channel to a device of the one or more devices;

selecting, based on the ranking, a selected channel of the plurality of channels for which utilization state of the selected channel is to be changed; and changing, in runtime, the utilization state of the selected channel to reduce overall power consumption by the plurality of channels.

17. The computer-implemented method of claim 16, further comprising monitoring, in runtime, utilization of the plurality of channels, and wherein the selecting is further based on the monitoring, in runtime, the utilization.

18. The computer-implemented method of claim 17, further comprising determining, based on the monitoring, in runtime, the utilization, whether a path group that includes the selected channel has a predefined relationship with a threshold, and wherein the selecting the selected channel is based on the selected channel having the predefined relationship with the threshold.

19. The computer-implemented method of claim 16, wherein the ranking includes:
   using at least a portion of the one or more criteria to determine a plurality of weights for the plurality of channels; and
   ranking the plurality of channels based on the plurality of weights.

20. The computer-implemented method of claim 16, further including:
   selecting the plurality of channels to be ranked, the selecting the plurality of channels to be ranked including:
      determining a list of channels;
      determining a plurality of path groups for the list of channels;
      determining whether one or more channels of the list of channels are to be removed from the list of channels, the determining being based on one or more factors including one or more sizes of the plurality of path groups; and
      removing at least one channel the one or more channels from the list of channels, based on determining that the at least one channel is to be removed, providing the plurality of channels to be ranked.

\* \* \* \* \*